United States Patent [19]

Murakami

[11] 3,939,371

[45] Feb. 17, 1976

[54] ROTARY ELECTRIC MACHINE

[75] Inventor: Tadao Murakami, Katsuta, Japan

[73] Assignee: Hitachi, Ltd., Japan

[22] Filed: July 2, 1974

[21] Appl. No.: 485,253

[30] Foreign Application Priority Data
July 4, 1973   Japan.............................. 48-74794

[52] U.S. Cl.................................. 310/154; 310/254
[51] Int. Cl.² ........................................ H02K 21/28
[58] Field of Search ........... 310/154, 152, 156, 181, 310/190–193, 254–259

[56] References Cited
UNITED STATES PATENTS

| | | | |
|---|---|---|---|
| 3,201,625 | 8/1965 | Smith et al........................... | 310/154 |
| 3,296,471 | 1/1967 | Cochhardt........................... | 310/154 |
| 3,693,037 | 9/1972 | West................................... | 310/154 |

Primary Examiner—Donovan F. Duggan
Attorney, Agent, or Firm—Craig & Antonelli

[57] ABSTRACT

A rotary electric machine comprising a plurality of magnets with magnetic poles made of different B-H characteristics is disclosed in which a magnet with high coercive force is arranged on the portion of each pole where the magnetic field is weakened and a magnet with high magnetic flux density on the portion of each pole where the magnetic field is strengthened or little weakened.

8 Claims, 10 Drawing Figures

3,939,371

ROTARY ELECTRIC MACHINE

BACKGROUND OF THE INVENTION

1. Field of the Invention

This invention relates to a rotary electric machine having permanent magnets, or more in particular to a rotary electric machine with a plurality of magnetic poles comprising a plurality of permanent magnets of different B-H characteristics so as to increase the amount of magnetic fluxes required for the rotary machine and further prevent demagnetization as desired, where the demagnetization means that the magnetic field is weakened.

2. Description of the Prior Art

Permanent magnets are widely used in the field of rotary electric machines. Desirable characteristics of magnets used for the electric rotary machines include high magnetic flux density B and high coercive force or intensity of magnetic field H. Generally, in the rotary electric machine which utilizes the amount of magnetic fluxes, a high magnetic flux density B leads to the advantage of the possibility of a smaller magnet size to obtain the same amount of magnetic fluxes, thereby reducing the size and weight of the machine. Also, a high magnetic field intensity H, which has the relation to the demagnetization due to the armature reaction, contributes to prevention of changes in the rotary machine characteristics which otherwise might occur due to the decreased amount of magnetic fluxes in operation, thereby maintaining the predetermined characteristics.

However, there exists no magnet which is high both in magnetic flux density B and coercive force H. For example, the anisotropic alnico magnet has a low coercive force of 700 Oe in spite of its high magnetic flux density B of 13,000 gauss. On the other hand, the anisotropic strontium ferrite magnet with a high coercive force of 3,400 Oe is as low as 4,000 gauss in magnetic flux density B.

There is a need for selection between these incompatible features in actual operation of a rotary electric machine with magnets. When demagnetization is emphasized, for example, magnets with a high coercive force are used, with the result that the small size of magnetic flux density B makes it necessary to enlarge the size of the magnets to obtain a predetermined amount of magnetic fluxes, leading to the disadvantage of the bulkiness of the machine. In the event that a high amount of magnetic fluxes is preferred, by contrast, magnets with high magnetic flux density are employed in spite of the disadvantage that the low coercive force H necessitates the incorporation of an exciting coil for demagnetization, thus complicating the internal structure and at the same time giving rise to the need for restoration of magnetic characteristics by the occasional flow of current in the exciting coil.

SUMMARY OF THE INVENTION

Accordingly, it is an object of the invention to provide a rotary electric machine which produces a comparatively high output with small demagnetization, thus obviating the disadvantages of the prior art.

According to the invention, one of the magnetic poles, say, N pole comprises a magnet with a different B-H characteristics, so that the magnet with high coercive force is arranged on the portion where the magnetic field is weakened and the magnet with high magnetic flux density on the portion where the magnetic field is strengthened or little weakened.

DESCRIPTION OF THE PREFERRED EMBODIMENTS an embodiment of the invention will be described in detail below by reference to the case where magnets are used for the magnetic field of a DC machine.

Figure 1:
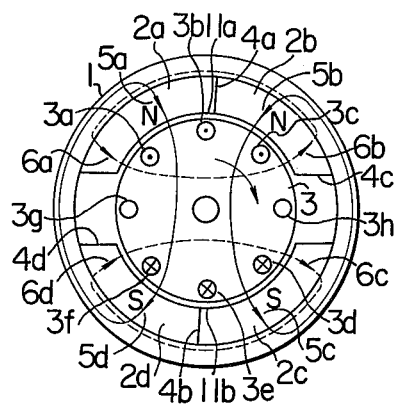
FIG. 1 is a front sectional view showing a DC machine employing permanent magnets for generating a magnetic field according to an embodiment of the invention.

Referring to FIG. 1 showing a front sectional view of the DC machine, reference numeral 1 shows a yoke, and numeral 2 permanent magnets making up magnetic poles mounted on the inner periphery of the yoke 1. Numerals 2a and 2b show N poles and 2c and 2d S poles. The N pole 2a and S pole 2c comprise anisotropic alnico magnets, while the other magnets 2b and 2d are made of anisotropic strontium ferrite magnets. Numeral 3 shows an armature. Numerals 3a to 3h show armature coils (hereinafter referred to merely as "the coils"), of which the coils 3a to 3c carry electric current coming up from the page and the coils 3d to 3f current going down into the page. The remaining coils 3g and 3h are in commutation. Numerals 4a and 4b show boundaries between N poles 2a and 2b of the magnet 2 and between the S poles 2c and 2d thereof respectively, the position of the boundary 4b being determined by the armature reactive magnetomotive force as will be described in detail later.

In the above-mentioned arrangement, main magnetic fluxes flow from N poles 2a and 2b to S poles 2e and 2d of magnet 2 as shown by arrows on the solid lines 5a to 5d, while current as shown flows in the coils 3a to 3f, so that the clockwise turning effort occurs in the armature 3 according to the well known Flemming's left hand rule. At the same time, armature reactive magnetomotive force is generated in the coils 3a to 3f in the directions shown by arrows on the dashed lines 6a to 6d. This condition will be explained in detail with reference to FIGS. 2 to 4.

Figure 2:
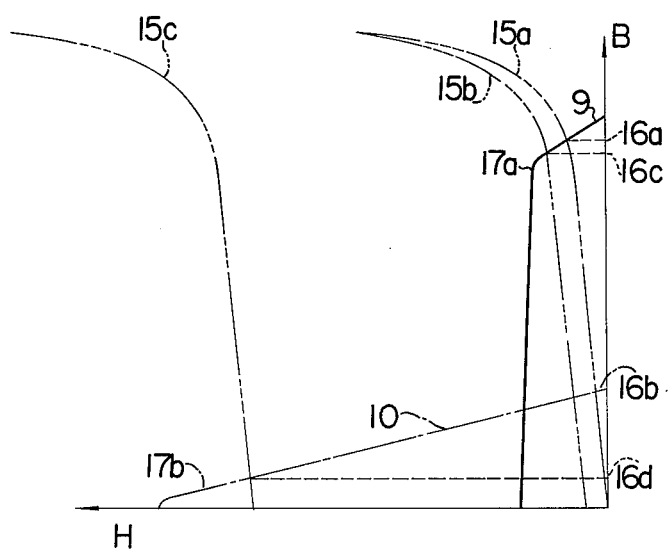
FIG. 2 is a B-H characteristic diagram for magnet 2 shown in FIG. 1.

The diagram of FIG. 2 shows the B-H characteristic of the magnet 2 in FIG. 1, the ordinate and abscissa representing the magnetic flux density B and the intensity H of magnetic field respectively. B-H curve 9 (full line) illustrates the characteristic of N pole 2a and S pole 2c, and the other B-H curve 10 (chain line) the characteristic of N pole 2b and S pole 2d.

Figure 3:
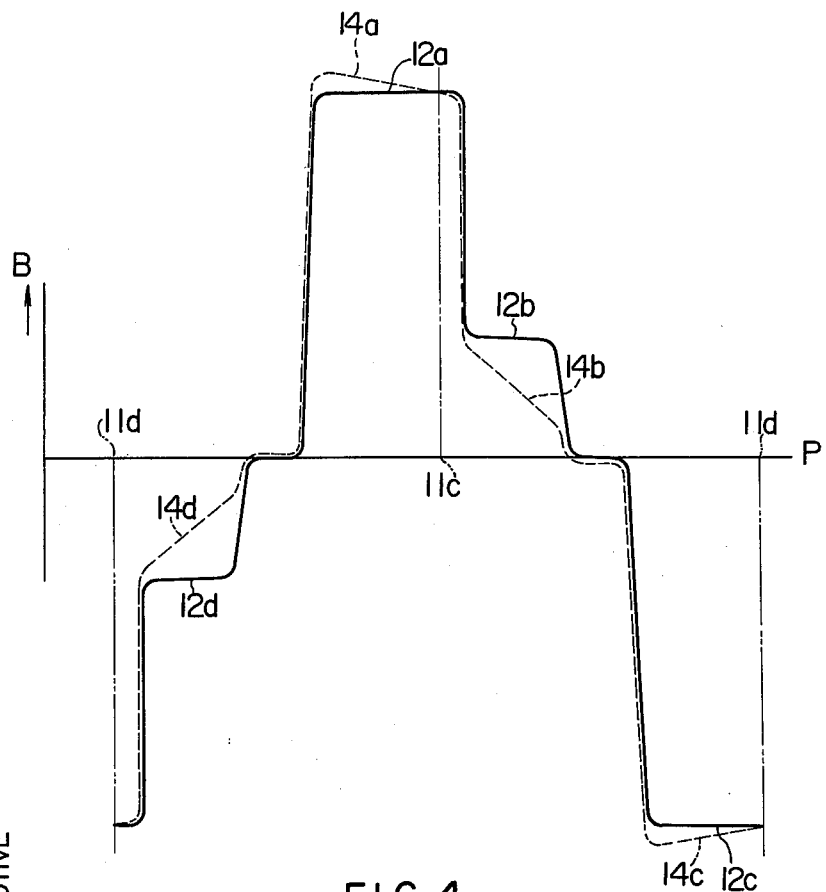
FIG. 3 is a diagram showing the distribution of magnetic fluxes on the periphery of the armature.

Referring to FIG. 3 showing a development of the magnetic flux distribution along the periphery of armature 3 due to magnet 2, the ordinate represents magnetic flux density B and the abscissa positions P of armature 3 on the periphery. A substantially intermediate point 11a between N poles 2a and 2b of magnet 2 of FIG. 1 corresponds to 11c, and a substantially intermediate point 11b between S poles 2c and 2d to 11d, the solid line indicated by 12a to 12d showing the magnetic flux density of N poles 2a, 2b and S poles 2c and 2d respectively.

Figure 4:
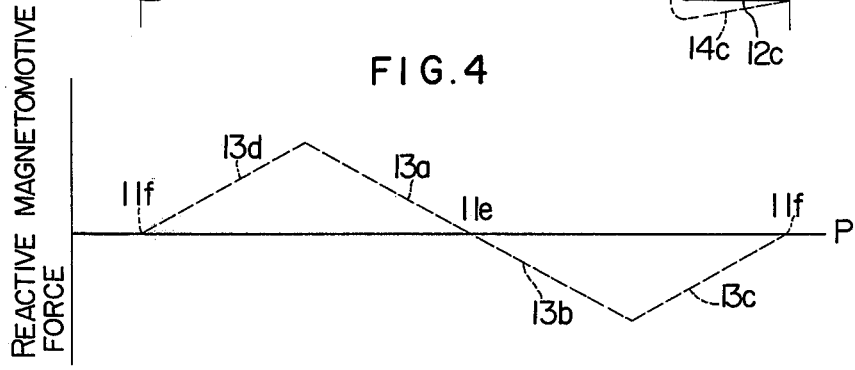
FIG. 4 is a characteristic diagram showing the distribution of the armature reactive magnetomotive force.

In FIG. 4 showing the distribution of magnetomotive force due to armature reaction, the ordinate represents the armature reactive magnetomotive force (hereinafter referred to as "the reactive magnetomotive force") and the abscissa positions P on the armature periphery as in the case of FIG. 3. In like manner, the center 11a of the N pole corresponds to 11e, and the center 11b of S pole to 11f, the dashed lines 13a to 13d showing the distribution of reactive magnetomotive force corresponding to the reactive magnetomotive forces 6a to 6d shown in FIG. 1. The reactive magnetomotive forces 13a to 13d cause distortions of the magnetic flux density of FIG. 3 as shown by dashed lines 14a to 14d. The processes of such distortions of the magnetic flux density distribution will be explained below with reference to FIG. 2.

In FIG. 2, reference numeral 15a shows a no-load saturation characteristic curve of the DC machine, numeral 15b to load saturation characteristic curve resulting from demagnetization due to armature reactive magnetomotive force in the neighbourhood of the boundary of 4c of the N pole 2b or boundary 4d of the S pole 2d.

Reference numeral 16a shows a magnetic flux density under unloaded conditions where there is no reactive magnetomotive force in the neighbourhood of the boundary 4a of the N pole 2a or the boundary 4b of the pole 2c, and numeral 16b a magnetic flux density under unloaded conditions where there is no reactive magnetomotive force in the neighbourhood of the boundary 4c or 4d of the N pole 2b or S pole 2d of FIG. 1 respectively. Numeral 16c shows the magnetic flux density resulting from demagnetization due to the reactive magnetomotive force in the neighbourhood of the boundary 4a or 4b of the N pole 2a or S pole 2c of FIG. 1 respectively, and numeral 16d the magnetic flux density resulting from the demagnetization due to the reactive magnetomotive force in the neighbourhood of the boundary 4c or 4d of the N pole 2b or S pole 2d of FIG. 1.

As will be obvious from FIG. 2, the magnetic flux densities 16c and 16d which are demagnetized by the reactive magnetomotive force under load do not fall below the points of inflection 17a and 17b respectively of the demagnetization curves, and therefore the magnetic flux density characteristic under no load in the absence of reactive magnetomotive force is reversible to regain points 16a and 16b.

By the way, the boundaries 4a and 4b of the magnetic poles 2a and 2c of FIG. 1 are determined in such a manner that the magnetic flux density does not fall below the point of inflection 17a of magnetization curve 9 of FIG. 2 due to the reactive magnetomotive force.

It will be noted from the foregoing explanation that a combination of demagnetization curves 9 and 10 of FIG. 2 prevents magnetic poles 2a to 2d of the permanent magnets of FIG. 1 from being subjected to permanent demagnetization even in the presence of reactive magnetomotive force as shown in FIG. 4. In addition, the extensive magnetic flux distribution characteristics 14a to 14d as shown in FIG. 3 makes possible high output from a compact machine as compared with the other DC machines having similar magnets, thus providing a superior DC machine without any demagnetization.

Figure 7:
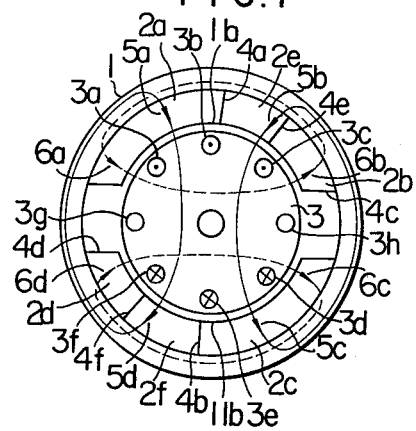
FIG. 7 is a front sectional view showing another embodiment of the invention.
Figure 8:
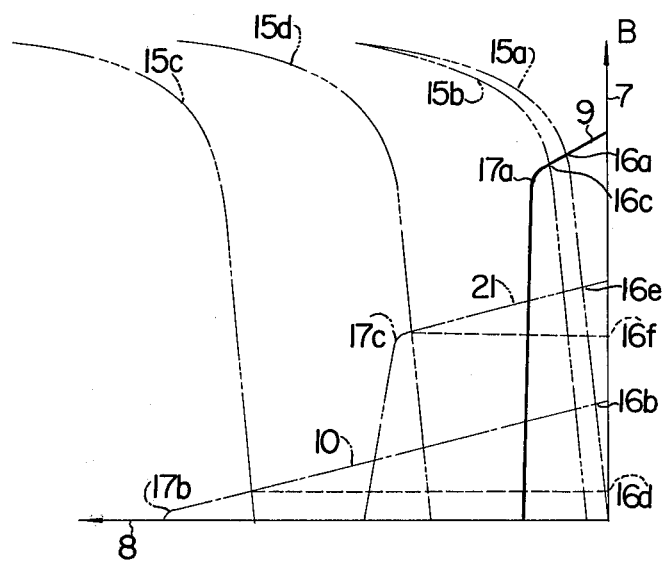
FIG. 8 is a B-H characteristic diagram of the magnets employed in the embodiment of FIG. 7.
Figure 9:
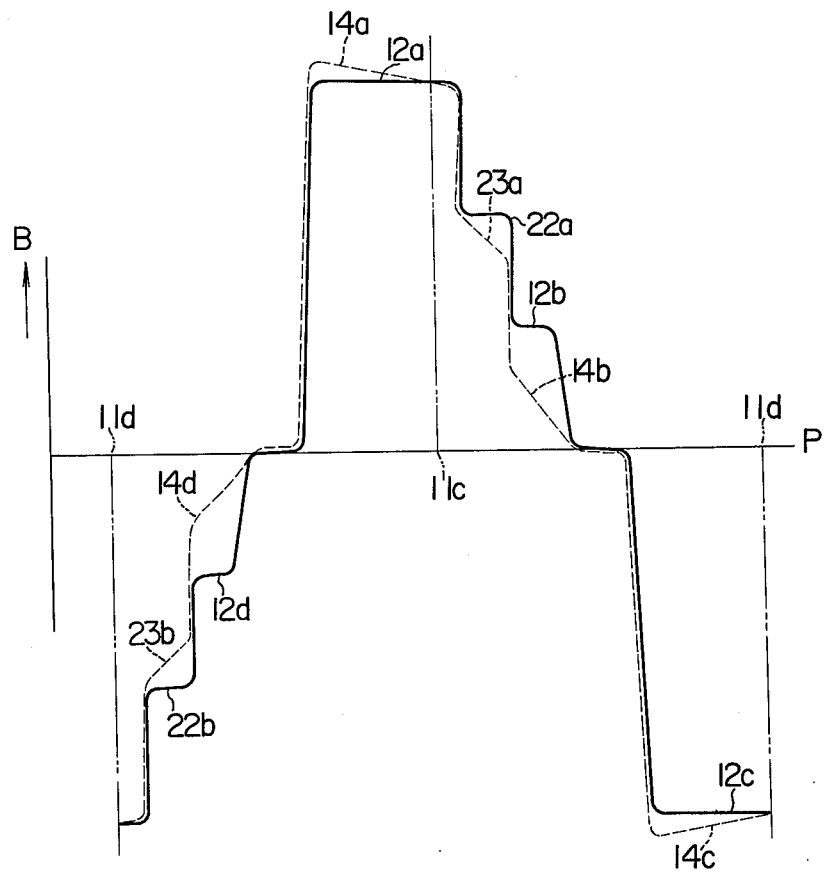
FIG. 9 is a diagram showing the distribution of magnetic fluxes on the armature periphery due to the magnets shown in FIG. 7.
Figure 10:
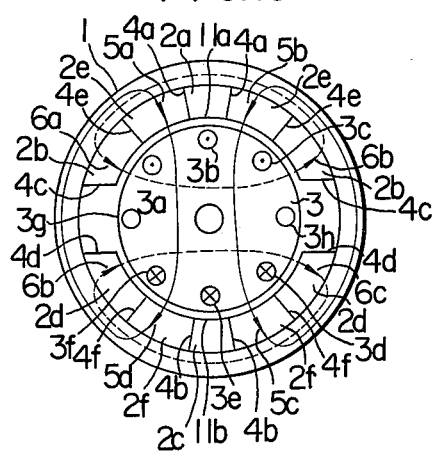
FIG. 10 is a diagram showing still another embodiment of the invention.

Different from the machine with two types of magnet materials as described above, the machines shown in FIGS. 7 to 9 include three types of magnet materials. In other words, an alnico magnet with a high coercive force of 1400 Oe and magnetic flux density of 8000 gauss is inserted between the anisotropic alnico magnet and the anisotropic strontium ferrite magnet as shown in FIG. 1. Reference numeral 2e shows an N pole and numeral 2f a S pole. Numeral 21 shows a B-H curve of this alnico magnet with high coercive force. The boundary 4e of the N pole of the high coercive force alnico magnet facing the anisotropic strontium ferrite magnet and the boundary 4f of the S pole of the high coercive force alnico magnet facing the anisotropic strontium ferrite magnet are determined in such a manner that the magnetic flux density does not fall below the point of inflection 17c of the B-H curve 21 of FIG. 8 due to the reactive magnetomotive force. Numerals 22a and 22b in FIG. 9 are curves showing magnetic flux distribution in the absence of reactive magnetomotive force and numerals 23a and 23b magnetic flux distribution under reactive magnetomotive force. This construction enables the amount of magetic fluxes to be increased as compared with the embodiment of FIG. 1. Unlike the embodiment under consideration where magnets with different materials are combined to form a magnetic pole, it is possible to change the B-H curve with the same material by changing the cooling speed or agent in the heat treatment for the manufacture of the magnets. The same purpose can be also achieved by changing the composition of the component elements of the same magnet material.

Figure 5:
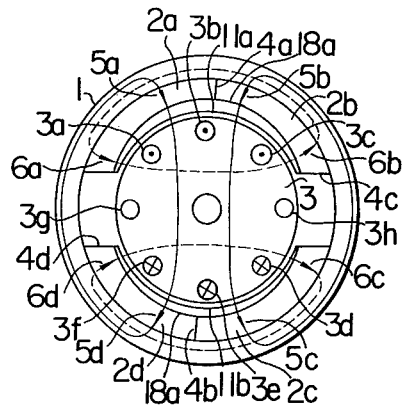
FIG. 5 is a front sectional view of a DC machine with a crescent-shaped magnetic material arranged on the surface of each of the magnets shown in FIG. 1.
Figure 6:
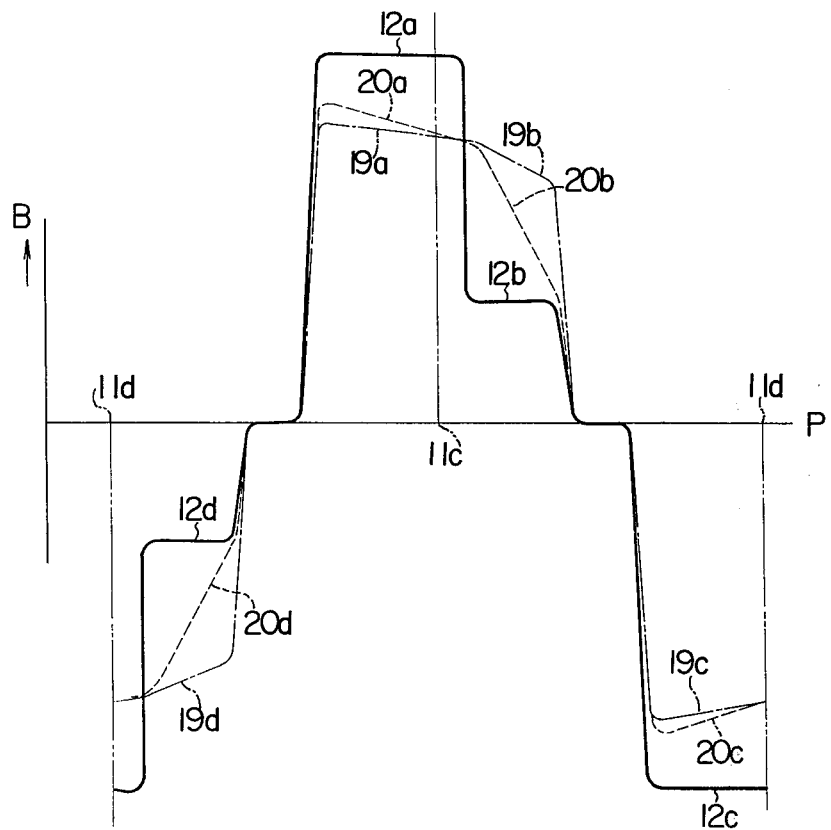
FIG. 6 is a diagram showing the distribution of magnetic fluxes in FIG. 5.

In still another embodiment shown in FIG. 5, crescent-shaped magnetic material 18 tapering on both sides is mounted on the periphery on the inner surface of the magnet 2. The provision of this magnetic material 18 realizes the magnetic flux density distribution as shown by one-dot chains 19a to 19d of FIG. 6, and also as shown by dashed lines 20a 20d due to the reactive magnetomotive force.

The method of increasing the amount of magnetic fluxes toward the armature by mounting a magnetic material on the inner surface of the magnet is well known. The machine as disclosed above having a magnet with a different B-H curve for a magnetic pole produces a big magnetic sound in actual operation as the magnetic flux density undergoes a sudden change at the boundary. This disadvantage is prevented by the magnetic material 18 smoothing the magnetic flux density distribution curve.

The reason why the magnetic material 18 in FIG. 5 is in the shape of a crescent is that magnetic fluxes flow from the magnets 2a and 2c of high magnetic flux density to magnets 2b and 2d of low magnetic flux density mostly through the boundaries 4a and 4b, while fewer magnetic fluxes flow nearer the sides. Of course, the magnetic material 18 may be provided in the uniform thickness with equal effect. Rather, if the situation allows the magnet 2 to be formed in uniform thickness, the uniform thickness of the magnetic material 18 has the advantage of the possibility to facilitate manufacture of armature 3 as it may take the form of a circle to assure a uniform gap between the armature and the magnetic material. Further, a lamination of such magnetic materials permits reduction in eddy current loss therein. This advantage is further enhanced by insulating the plurality of such materials making up the lamination.

The above described embodiments are concerned, with clockwise rotation only, and if both the clockwise and counterclockwise rotations are involved, a magnet with high magnetic flux density may be arranged at the center of a magnetic pole, and magnets with progressively high coercive force are arranged toward the sides of the pole. The same advantage as obtained in the foregoing embodiment may be achieved by providing on the magnet a magnetic material similar to that mentioned already.

Furthermore, the material of the magnet is not limited to those mentioned above. Also, the invention is applicable to those machines in which magnets are mounted on the rotor or stator as well as the DC electric machine.

It will be easily understood from the above description that the present invention is advantageous both in output and demagnetization effect over the conventional rotary electric machines employing permanent magnets of the same characteristics for their magnetic poles.

I claim:

1. In a rotary electric machine comprising a rotor, a stator, and at least a pair of magnetic poles associated with one of said rotor and stator, each of said pair of magnetic poles including at least one magnet having different B-H characteristics along the direction of rotation of said rotor, said magnet including a portion having the highest coercive force where the magnetic field is weakened and a portion having the highest magnetic flux density where the magnetic field is strengthened, the improvement comprising said magnet including intermediate portions where the magnetic flux density and the coercive force are progressively substantially increased and decreased respectively.

2. A rotary electric machine according to claim 1, further comprising a magnetic material covering each of said magnetic poles.

3. A rotary electric machine according to claim 2, in which said magnetic material comprises a lamination of a plurality of magnetic material elements.

4. A rotary electric machine according to claim 3, in which each of said magnetic materials components making up said lamination is electrically insulated.

5. A rotary electric machine according to claim 1, further comprising a magnetic material covering each of said magnetic poles, said magnetic material being progressively thinner toward the opposite ends thereof along the periphery.

6. A rotary electric machine according to claim 1, wherein each said magnetic pole includes two permanent magnets, each of said two permanent magnets having different B-H characteristics, and wherein said two permanent magnets are contiguous to one another at said intermediate portion.

7. A rotary electric machine according to claim 1, wherein each said magnetic pole includes three permanent magnets, each of said three permanent magnets having different B-H characteristics, and wherein said three permanent magnets are respectively contiguous to one another at said intermediate portions.

8. A rotary electric machine according to claim 7, wherein a first of said three permanent magnets has the highest magnetic flux density and the lowest coercive force, a second of said three permanent magnets along the periphery of said magnetic pole has an intermediate magnetic flux density and an intermediate coercive force, and a third of said three permanent magnets along the periphery of said magnetic pole has the lowest magnetic flux density and the highest coercive force.

* * * * *